J. MASON.

Liquid-Meter.

No. 5,084. Reissued Oct. 1, 1872.

Witnesses
Fred Haynes
Fred Church

Joshua Mason.

A.M. PHOTO-LITHOGRAPHIC CO. N.Y. (OSBORNE'S PROCESS.)

UNITED STATES PATENT OFFICE.

JOSHUA MASON, OF PATERSON, NEW JERSEY.

IMPROVEMENT IN LIQUID-METERS.

Specification forming part of Letters Patent No. 82,138, dated September 15, 1868; reissue No. 5,084, dated October 1, 1872.

*To all whom it may concern:*

Be it known that I, JOSHUA MASON, of Paterson, in the county of Passaic and State of New Jersey, have invented certain new and useful Improvements in Valves and Valve-Gear for Water and other Liquid Meters or Motors; and I do hereby declare that the following is a full, clear, and exact description of the same, reference being had to the accompanying drawing forming part of this specification, and in which—

Figure 1:
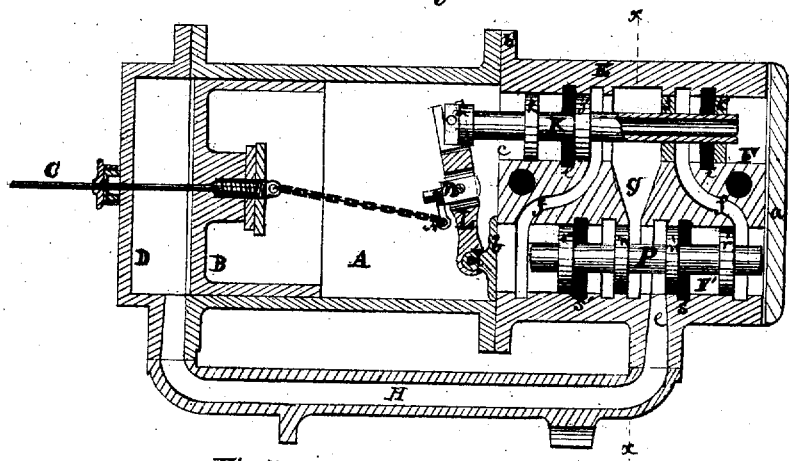
Figure 3:
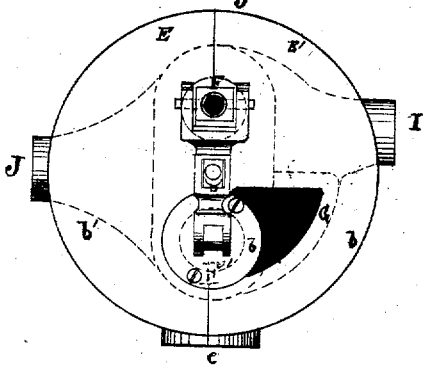
Figure 2:
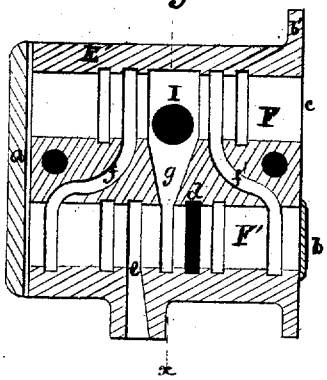
Figure 4:
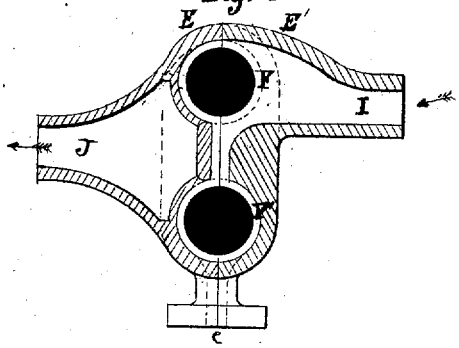

Figure 1 represents a central longitudinal section of a liquid-meter constructed in accordance with my improvement; Fig. 2, a longitudinal interior view of the opposite half of the valve-case to that shown in Fig. 1; Fig. 3, a face view of the inner end of the valve-case, with the device for operating the primary valve attached; and Fig. 4, a transverse section of the valve-case taken as indicated by the line *x x* in Figs. 1 and 2.

Similar letters of reference indicate corresponding parts.

My invention relates to that description of liquid meters or motors, including water-pressure engines, in which a reciprocating piston is used within a cylinder that, in the case of a meter, forms the measure of capacity, said piston being made to operate a primary valve that serves to control the passage of the liquid to operate a secondary valve, for the purpose of reversing the action of the piston within the cylinder; and my invention consists in a novel and advantageous end arrangement of said valves with their chambers, relatively to the cylinder; also in a peculiar construction of the valves, of a multiplied head or disk form, in combination with the passages which they control, and in an arrangement of certain of the ports and passages, whereby not only is the secondary valve kept shut by the pressure of the fluid in a static relationship or action upon it, but also by the flow of the liquid through it; likewise said invention further covers a chain or link-like pulling connection and thrusting action of the piston in the cylinder with and on the primary valve, and tubular-stem construction to the latter, to give to the valve a balance character as it were—that is, to relieve it of objectionable end resistance or pressure.

Referring to the accompanying drawing, which represents the invention as applied to a water or other liquid meter—although the same, by suitably strengthening or proportioning certain parts, is equally applicable to water-pressure engines—A represents the measuring cylinder or chamber of the meter, and B its piston, arranged to reciprocate therein by the pressure of the water or other liquid alternately acting on opposite sides or faces of it. C is the piston-rod, which may be used to work any suitable indicator for registering the amount of liquid passed through the meter, or which, in the case of a water-pressure engine, may be made stouter than represented, and be used to transmit power from the piston for various working or driving purposes. The outer or back end of the cylinder A is closed by a lid or bonnet, D, while its inner or front end has connected with it, or bolted onto it, a valve box or case—made, say, in halves or sections E E′, bolted or otherwise secured together, and constructed to form cylindrical valve-chambers F F′, arranged parallel to the axial line of the cylinder A, and which may be closed at their outer ends by a cap-plate, *a*, while the inner end of the one valve-chamber F′ may be closed by a plate or disk, *b*, and the corresponding end of the other valve-chamber F left in open communication at *c* with the cylinder A. Flanged face plates or pieces *b′ b′* to the sections E E′ form a lid or cover to the inner end of the cylinder A. The one-half E′ of the double valve-case communicates, by a passage-way, G, with the cylinder A on the front or inner side of the piston B. This passage-way connects, by an opening, *d*, made in the one section E′ of the valve-case, with the one or lower valve-chamber F′, which latter has a passage-way and branch, *e*, that connects, by a lower passage, H, with the back or outer end of the cylinder A, in rear of the piston B. The valve-chamber F′ is also connected, by passages *f f′* and *g*, with the other or upper valve-chamber F, the passage *g* communicating, by a branch, I, with any suitable inlet-pipe, and said valve-chamber F′ being further connected, by ports *s s′* made in the one valve-case section E, with an outlet-branch, J. The upper valve-chamber F has openings *i i′* made in section E of the valve-case, said openings connecting said valve-chamber with the outlet-branch J. Arranged within the valve-chamber F is the primary valve K, made up of disks or piston-heads *j j'* and *k k'*, attached to a tubular stem, and working or reciprocating in a close manner to throw its disks or heads *j j'* over and to opposite sides, alternately, of the passages *f f'*, but not crossing, by any of its heads *j j'* and *k k'*, the ports or openings *i i'*, said valve being thus operated by the piston B as it approaches or finishes its strokes in opposite directions, and which may be effected as follows: L is a jaw-shaped lever working on a fulcrum at *l*, and coupling or gearing at its upper or jaw-shaped extremity, through a cross-pin, *m*, with the end of the stem of the valve K that enters, say, the cylinder or chamber A. Pivoted to the lever L is a stud, M, connected, by a chain or chains, N, with the piston B, on opposite sides of a central steel disk or block, O. The chains N are of sufficient length to remain slack till the piston B approaches the back end of its stroke, when they pull on the lever L to throw the valve K to the position represented for it in Fig. 1, while, on the piston B returning and approaching the opposite end of its stroke, the disk or block O strikes the stud M to shift the valve K, so as to give its heads *j j'* a reversed position, relatively, to the passages *f f'*. P is a secondary and free or independent valve, arranged to reciprocate within the valve-chamber F', and constructed with close-fitting heads or disks *n n'* and *r r'*, the disks *r r'* playing up to, but not crossing, the passages *f f'* and ports *s s'*, and the disk *n'* crossing, alternately, to opposite sides of the passage-way or branch *e*, while the other disk *n* crosses to opposite sides of the port or opening *d*. This valve P may be thus limited in its throw by its stem striking the closed ends of its chamber F'.

As the valves K and P are situated in the drawing, water entering by the inlet I is conveyed by the passage *g*, between the heads *n* and *n'* of the secondary valve P, to the branch *e*, and along the passage H to the back of the piston B, to propel the latter to the right, the water previously supplied the cylinder A at the same time passing off from or in front of the piston, through the passage-way G and opening *d*, into the valve-chamber F', between the heads *n* and *r* of the valve P, and out through the port *s'* into the general outlet J. On the valve K being reversed, which takes place when the piston B arrives at the opposite end of its stroke, water entering by the inlet I is conveyed by the passage *g* between the valve-disks *n n'*, and from thence, through the opening *d* and passage-way G, into the cylinder A in front of the piston B, while the water in rear of the latter escapes, by the passage H, branch *e*, and through the port *s*, into the general outlet J. The secondary valve P is thus suddenly changed or reversed to alternate in opposite directions the flow of water through the cylinder A, and to keep up the general action by means of the primary valve K as it is operated by the piston B, said primary valve alternately connecting, first, the one passage *f* with the water-inlet passage *g*, and passage *f'* with the outlet-port *i'*, to enter water at back of the valve-head *r'* and pass it from in front of the opposite head *r*, to throw the valve P to the left, and afterward connecting the passage *f'* with the inlet-passage *g*, and passage *f* with the outlet-port *i*, to reverse the position of the valve P.

Though the valves, as it will be seen, are of what may be termed a balance character, while moving, by reason of the incoming and outgoing water acting on opposite sides of their heads or disks, the hollow stem of the valve K favoring such action, so far as that valve is concerned, yet the free and independent valve P, once shot, is subjected to the static pressure of the water on the outer surface of either of its end disks, alternately, to keep said valve in the position to which it has been thrown; also the water, in passing through said valve, has the direction of its current so established as to aid in producing a similar effect of keeping the valve closed to the position it has been shot by reason of the relative arrangement of the passages *g e*, and ports or openings communicating therewith. Thus, supposing water to be entering the branch *e* from the passage *g*, it, in flowing obliquely through the valve, acts upon the disk *n* to keep the valve P shot to the right; or, supposing the position of the valve P to be reversed, the entering water, in working its way obliquely through the valve from the passage *g* to the opening *d*, acts upon the disk *n* to keep the valve P shot to the left. In this way the flow of the water through the valve acts in a direction to which the valve has been last moved, and this, aided by the pressure of the water on the outer end disks *r r'*, alternately, as hereinbefore referred to, prevents all shifting of the valve by suddenly checking the flow.

What is here claimed, and desired to be secured by Letters Patent, is—

1. The combination, with the meter or engine cylinder, and its reciprocating piston B, of primary and secondary valves K and P, when arranged for operation in relation to said cylinder, substantially as shown and described.

2. The primary and secondary valves K and P, formed with disks or heads *j j'*, *k k'*, and *n n'*, *r r'*, for operation within valve-chambers F F', in combination with ports and passages *f f' i i'*, inlet-passages *g*, branch *e*, passage-way H, ports *s s'*, and passage G with its opening *d*, essentially as specified.

3. The arrangement of the ports or passages which control the ingress and egress of liquid through the secondary valve, and of the passages in connection therewith, in such manner that the flow of the liquid through the valve acts on the latter in the same direction as that to which it has been last shot, and so that said valve is kept shot or thrown in opposite or reverse positions by the pressure of the fluid on its opposite heads alternately, substantially as herein set forth.

4. The primary valve K, operated by the piston of the meter or engine cylinder, essentially as described, and having an open tubular stem in free communication with the latter, as and for the purposes specified.

JOSHUA MASON.

Witnesses:
FRED. HAYNES,
FERD. TUSCH.